(12) United States Patent
Bernhard et al.

(10) Patent No.: US 8,979,187 B2
(45) Date of Patent: Mar. 17, 2015

(54) SEAT OR BENCH FOR A MOTOR VEHICLE

(75) Inventors: Sabine Bernhard, Kalsdorf (AT);
Manuel Erlacher, Radenthein (AT);
Achim Schmidt, Graz (AT)

(73) Assignee: MAGNA STEYR Fahrzeugtechnik AG & Co. KG, Graz (AT)

( * ) Notice: Subject to any disclaimer, the term of this patent is extended or adjusted under 35 U.S.C. 154(b) by 214 days.

(21) Appl. No.: 13/364,643

(22) Filed: Feb. 2, 2012

(65) Prior Publication Data
US 2012/0193952 A1    Aug. 2, 2012

(30) Foreign Application Priority Data
Feb. 2, 2011    (DE) .................. 10 2011 010 056

(51) Int. Cl.
*B60N 2/32* (2006.01)
*B60N 2/36* (2006.01)
*B60N 2/20* (2006.01)
*B60N 2/30* (2006.01)
*B60R 7/04* (2006.01)

(52) U.S. Cl.
CPC ........ *B60N 2/36* (2013.01); *B60N 2/206* (2013.01); *B60N 2/3015* (2013.01); *B60N 2/3031* (2013.01); *B60R 7/043* (2013.01); *B60N 2002/363* (2013.01)
USPC ........................................... 297/129; 297/118

(58) Field of Classification Search
CPC .......... B60N 2/02; B60N 2/0292; B60N 2/20; B60N 2/206; B60N 2/32; B60N 2/34; B60N 2/36
USPC ................. 297/118, 129, 188.01, 353, 354.1; 296/65.01, 65.06
See application file for complete search history.

(56) References Cited

U.S. PATENT DOCUMENTS

| | | | | |
|---|---|---|---|---|
| 2,105,740 A * | 1/1938 | Knudson | .......................... | 296/69 |
| 2,916,325 A * | 12/1959 | Estes et al. | ...................... | 296/66 |
| 3,879,081 A * | 4/1975 | Hockley et al. | .......... | 296/190.02 |
| 4,458,941 A * | 7/1984 | Venable | ........................ | 297/118 |
| 6,837,531 B2 * | 1/2005 | Mack et al. | ................. | 296/65.09 |
| 7,044,550 B2 * | 5/2006 | Kim | ........................... | 297/283.3 |
| 7,628,438 B2 * | 12/2009 | Partch | ....................... | 296/24.46 |
| 2005/0012373 A1 * | 1/2005 | Fujita et al. | .................... | 297/337 |
| 2012/0193949 A1 * | 8/2012 | Bernhard et al. | .......... | 297/184.1 |

* cited by examiner

*Primary Examiner* — Philip Gabler
(74) *Attorney, Agent, or Firm* — Jordan IP Law, LLC; Todd A. Vaughn

(57) ABSTRACT

A motor vehicle including at least one seat and/or at least one bench having a seat surface and a backrest. The backrest can be moved into a position above the seat surface in which the backrest and the seat surface lie opposite one another. In addition, the front edge of the seat surface and an edge of the backrest that lies closest to it can be connected with an additional element, for example, a roller blind or a plate.

17 Claims, 5 Drawing Sheets

SEAT OR BENCH FOR A MOTOR VEHICLE

CROSS-REFERENCE TO RELATED APPLICATIONS

The present application claims priority under 35 U.S.C. §119, to German Patent Application No. 10 2011 010 056.3 (filed on Feb. 2, 2011), which is hereby incorporated by reference in its entirety.

FIELD OF THE INVENTION

The invention relates to a motor vehicle having at least one seat and/or at least one bench, each having a seat surface and a backrest.

BACKGROUND OF THE INVENTION

Aside from the function of a seat or bench in a motor vehicle as a seating opportunity, these elements frequently also fulfill other functions. For example, a rear bench can generally be folded down so that the trunk space of a motor vehicle can be enlarged. Aside from the simple possibility of folding them down, more complex functions can also be integrated into a seat or a bench.

For example, DE 37 05 059 A1 discloses a motor vehicle seat having a backrest that can be folded forward onto the seat part, where a plate-shaped wall part is mounted on the rear side, in the upper region of the backrest, so as to pivot, on which part a further plate-shaped wall part is held so as to pivot about a pivot axis that is parallel to that. The two wall parts can be folded against the rear of the backrest, folded against one another, and then form a hard, flat shelf surface for luggage when the backrests folded forward. Furthermore, the two wall parts, together, can be folded up into an upright position, relative to the folded-down backrest, and fixed in place in such manner that a container for luggage that is open toward the top is formed, which container can furthermore be dosed if the second wall part is pivoted away from the first wall part and locked by means of the locking device of the backrest, where the second wall part forms the container lid.

Furthermore, DE 10 2004 009 699 B4 discloses a device for expanding the trunk space of a motor vehicle having a rear seat that has a seat part and a backrest part, which can be moved between a backrest part. use position and a backrest part loading position. A normal trunk space is disposed behind the rear seat, which space preferably has a trunk bottom that preferably reaches all the way to the rear seat and is composed of at least one trunk bottom base plate and at least one trunk bottom expansion plate. The trunk bottom expansion plate can be disposed in an expansion plate rest position in the backrest use position, in the region of the trunk bottom base plate, and can be disposed, in the backrest part loading position, in front of the trunk bottom base plate, covering the seat part at least in certain regions, for an expansion of the trunk bottom, an expansion plate expansion position. In this connection, the backrest part can be pivoted about a backrest part pivot axis that runs in the transverse vehicle direction, between a backrest part use position and the backrest part loading position. The backrest part pivot axis is disposed on an upper end region of the backrest part, seen in the vertical vehicle position, when the backrest part is in the backrest part use position.

Another solution for creating luggage space is finally indicated in DE 10 2006 022 424 A1, which discloses a roller blind for use in the region of a front-seat passenger seat of a motor vehicle, where the front-seat passenger seat has a seat part and a backrest, and the roller blind has a roll-up shaft and a planar structure disposed between a holding device for the roller blind and the roll-up shaft, and the planar structure can be unrolled from the roll-up shaft counter to a spring force. The roll-up shaft is mounted in the region of the front-seat passenger seat, in the transverse direction of the motor vehicle, in the dashboard of the motor vehicle, and the holding device can be connected with the front-seat passenger seat. In this connection, it is provided that the front-seat passenger seat has at least one accommodation for connecting the holding device and the accommodation, in the region of the seat part. In the case of such an embodiment, the leg room of the front-seat passenger seat can be securely covered, so that luggage situated there or small animals situated there are secured.

It is a disadvantage of the known solutions that they are adapted to the habits of the users of motor vehicles only in limited manner. This is because frequently, these users place objects on the seat surface of seats and benches, as long as no persons are sitting on them. However, the solutions disclosed in the state of the art do not make it possible to conveniently protect objects that have been placed on the seats in this way from curious glances and access.

SUMMARY OF THE INVENTION

It is, therefore, the task of the present invention to indicate an enhanced seat or an enhanced bench for a motor vehicle. In particular, the possibility is supposed to be created of protecting objects placed on the seats from curious glances and access, in simple manner.

A task of the invention is accomplished by means of a motor vehicle of the type stated initially, in which the backrest can be moved into a position above the seat surface, in which the backrest and the seat surface lie opposite one another, and the front edge of the seat surface and an edge of the backrest that lies closest to it can be connected with an additional element in this position of the backrest, in other words when the backrest and the seat surface lie opposite one another, there exists at least one vertical line that intersects the seat surface and the backrest.

The disadvantages of the prior art are overcome by means of the invention, because a secured luggage area is created by the backrest and the aforementioned additional element, the bottom of which area is formed by a seat surface of a seat or a bench. The additional element closes off the luggage area toward the front, the backrest closes it off toward the top. In this way, the habits of users of motor vehicles, of putting objects down on unoccupied seats or benches, are taken into account. These objects can now be protected from curious glances and access with only a few hand motions, and for this reason the invention is particularly suitable for convertibles.

Advantageous embodiments and further developments of the invention are now evident from the dependent claims and from the description in conjunction with the figures.

It is advantageous if the backrest, in the stated position, is oriented essentially parallel to the seat surface and at a distance from the same. In this manner, the available space can be optimally utilized, or a luggage area having an advantageous shape, approximately block-shaped, is obtained. Furthermore, here there is the advantage that the backrest, which is approximately in a horizontal position in the variant presented here, can additionally be used as a shelf surface.

It is advantageous if the additional element is formed by a roller blind. Roller blinds can be stored in space-saving manner, i.e., rolled up, and therefore, conveniently find room in the confined conditions of motor vehicles. Furthermore, their handling is simple, because they merely have to be rolled up and attached for their use as intended. Finally, they do not require much room during manipulation, as is the case for plate-shaped elements, for example.

It is advantageous, in this connection, if the roller blind is rolled up in the backrest. There is usually sufficient space present in the backrest to accommodate a roller blind. Furthermore, the secured luggage area can be produced in one motion, because the user has his/her hands on the backrest in any case, in order to bring it into a position above the seat surface. Therefore only one further hand motion is needed to pull the roller blind out of the backrest.

It is also advantageous, in this connection, if the roller blind is rolled up in the seat. There is usually sufficient space available in the seat, as well, to accommodate a roller blind. Furthermore, the secured luggage area can be produced conveniently, because it is relatively easy for the driver, who after all is generally outside the vehicle when manipulating the backrest and the roller blind, to pull a roller blind upward, in other words toward himself/herself.

It is also advantageous if the additional element is formed by a plate that is mounted to rotate on the backrest. Plates can be configured to be comparatively stable, so that it is difficult to break the secured luggage area open.

It is particularly advantageous if the backrest is protected from ambient influences on the side that faces away from the backrest surface. In this connection, it is advantageous if the backrest is painted, particularly with the same paint as the motor vehicle. As has been mentioned, the invention presented is particularly well suited for producing a luggage area in a convertible. In this connection, the backrest is exposed to rain and, in particular, also to sun radiation. In order for the backrest to be durable, it is recommended to protect it accordingly.

Finally, it is particularly advantageous if a wind deflector is integrated into the backrest. In this manner, the backrest can perform a dual function, because it is not only involved in the creation of a secured luggage area, but also can accommodate a wind deflector that protects the passengers of a convertible from a bothersome air stream.

The above embodiments and further developments of the invention can be combined in any desired manner.

BRIEF DESCRIPTION OF THE DRAWINGS

The invention is described in more detail in the enclosed figures and drawings, which present an implementation example. The drawings demonstrate.

DETAILED DESCRIPTION OF EMBODIMENTS

Figure 1:
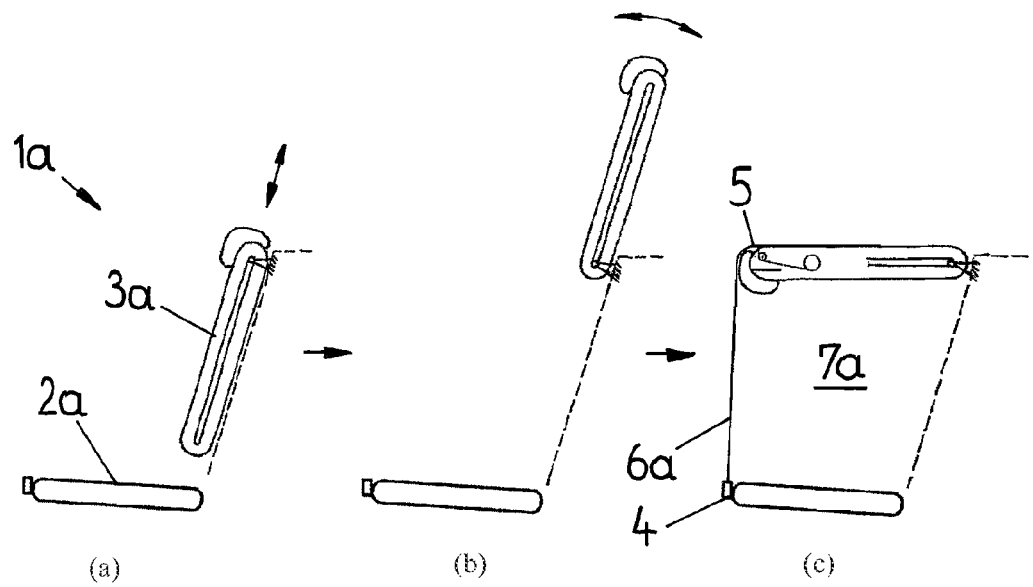
FIGS. 1A to 1C illustrate a first embodiment of the invention, in which the backrest is pushed up and folded forward.

FIGS. 1A to 1C illustrate side views of a rear bench 1a of a motor vehicle, having a seat surface 2a and a backrest 3a, in different states. Equivalently, this could also be a bench in a different position in a bus having multiple rows of seats) or an individual seat. In accordance with the invention, the backrest 3a can be moved or otherwise manipulated into a position above the seat surface 2a, in which the backrest 3a and the seat surface 2a lie opposite one another and the front edge 4 of the seat surface 2a and an edge 5 of the backrest 3a that lies closest to it can be connected with an additional element 6a.

In concrete terms, the backrest 3a can be pushed in an upward direction relative to the seat surface 2a (FIG. 1B), proceeding from a use position intended for seating (FIG. 1A), and then be pivoted about a pivot axis forward or to the left (FIG. 1C). The backrest 3a is then oriented, in the stated position of FIG. 1C, essentially parallel to the seat surface 2a and at a spatial distance from the same.

Figure 4:
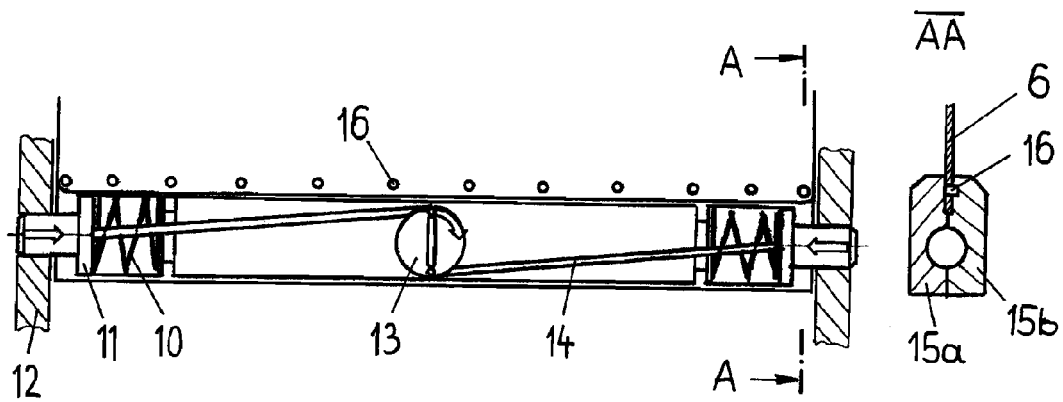
FIG. 4 illustrate a crossbar affixed at the end of the roller blind, for fixation of the same, in detail.

In this example, a roller blind 6a rolled up in the backrest is provided as an additional element, which blind can be fixed in place on the front edge 4 of the seat surface 2a. The backrest 3a, together with the roller blind 2a, then forms a closed-off space 7a, in which objects can be stored. It is advantageous if the seat surface 2a forms a shelf surface in the normal use position. Objects that have already been put down there can be protected from curious glances and access, without their position having to be changed, using the backrest 3a and the roller blind 6a, particularly if the roller blind 6a is configured to be lockable (FIG. 4). In this manner, a convertible, for example, can be parked without worries.

FIGS. 2A to 2C illustrate another embodiment of the invention in the form of a rear bench 1b. In this connection, a backrest 3b can be pivoted about a pivot axis forward or to the left (FIG. 2B), proceeding from a use position intended for seating (FIG. 2A), about an upper joint, and then the luggage area 7b can once again be closed off with a roller blind 6b (FIG. 2C). Here again, the roller blind 6b is rolled up in the backrest 3b.

Figure 3:
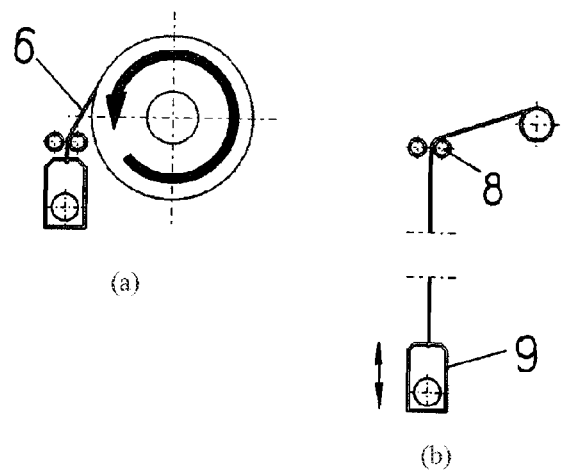
FIGS. 3A and 3B illustrate a roller blind in rolled up and unrolled positions, respectively.

FIGS. 3A and 3B schematically illustrate how the roller blind 6, proceeding from a rolled-up state (FIG. 3A) can be unrolled by way of a guide roll 8 (FIG. 3B). A crossbar 9 disposed on the roller blind 6, at the bottom, which bar serves for better handling and fixation of the roller blinds 6, can also be seen, FIG. 4 illustrates the crossbar 9 in longitudinal section, with a half-shell 15b lifted off. The crossbar 9 has a pair of locking elements 11 spaced apart and disposed on the side and impacted by springs 10, which elements engage into recesses of the side paneling 12 of the motor vehicle. The locking elements 11 can be moved inward by way of a rotary handle 13, by way of tension rods 14, thereby releasing the roller blind 6 again. The crossbar 9 includes a pair of half-shells 15a and 15b, in which the roller blind 6 is fixed in place using pins 16 (see cross-section AA).

Figure 2:
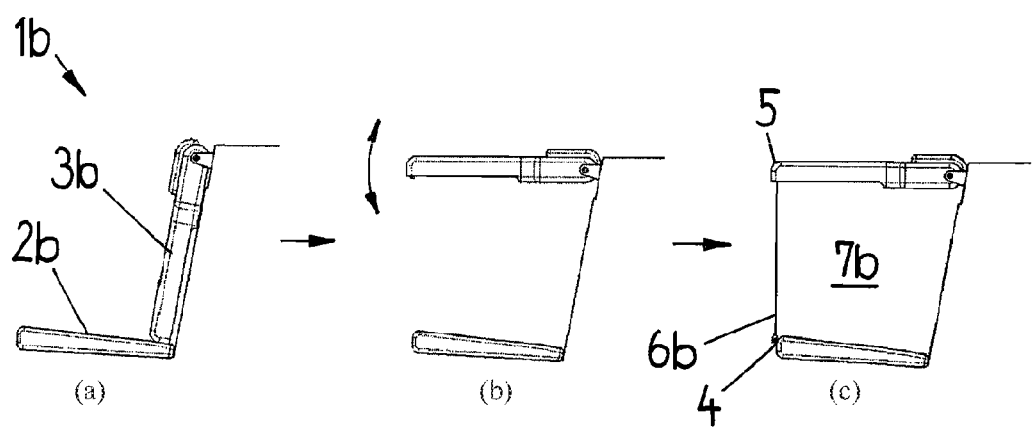
FIGS. 2A to 2C illustrate a second embodiment of the invention, in which the backrest is pivoted forward about an upper edge thereof.

In the examples illustrated in FIG. 1 and FIG. 2, it is assumed that the roller blind 6a and 6b is mounted in the backrest 3a, 3b. Alternatively, of course, it is also possible for both variants that the roller blind 6a, 6b is rolled up in the seat. This is then pulled up and attached on the edge 5 of the backrest 3a, 3b that lies closest to the front edge 4 of the seat surface 2a to 2d. What has already been said applies analogously.

In place of a roller blind 6, 6a, 6b, a plate mounted on the backrest 3a, 3b so as to rotate can also form the additional element that connects the front edge 4 of the seat surface 2a to 2d and an edge 5 of the backrest 3a, 3b that lies closest to it (not shown). This plate is disposed, in a use position of the backrest 3a, 3b, behind the same and is pivoted upward and forward, by 270°, in the variant illustrated in FIGS. 1A to 1C, by way of a hinge disposed on the upper edge of the backrest 3a, 3b (in FIG. 1C the hinge then lies on the left). In the variant shown in FIGS. 2A to 2C, this plate is pivoted down and forward, by 90°, by way of a hinge disposed on the lower edge of the backrest 3a, 3b (in FIG. 2C the hinge then again lies on the left).

Independent of this, the variant of the backrest 3a illustrated in FIGS. 1A to 1C can be protected from ambient influences on the side that faces away from the backrest surface. The same holds true, of course, also for the aforementioned plate that closes off the luggage area 7a, 7b toward the front. The backrest 3a and/or the plate can be painted for this purpose, particularly with the same paint as the motor vehicle. These measures are particularly advantageous if the said elements are installed in a convertible, for example.

FIGS. 5A to 5C illustrate another advantageous variant of a rear bench 1c having a backrest 3c that is very similar to the backrest 3b illustrated in FIG. 2. In contrast to the backrest 3b illustrated in FIG. 2, a wind deflector 18a that is normally stored under a cover 17 is also integrated into the backrest 3c, which deflector can be tilted up when needed.

Figure 5:
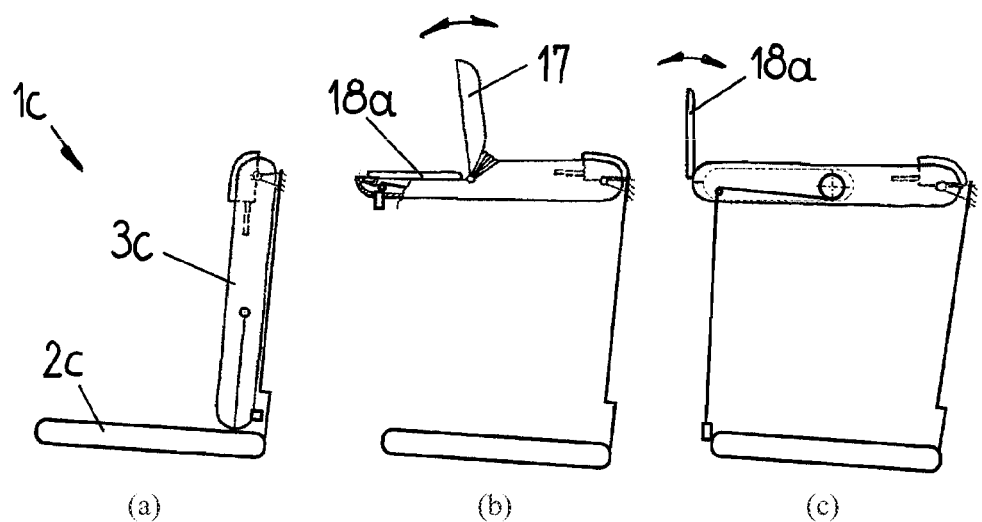
FIGS. 5A to 5C illustrate a backrest having a first variant of an integrated wind. deflector.
Figure 6:
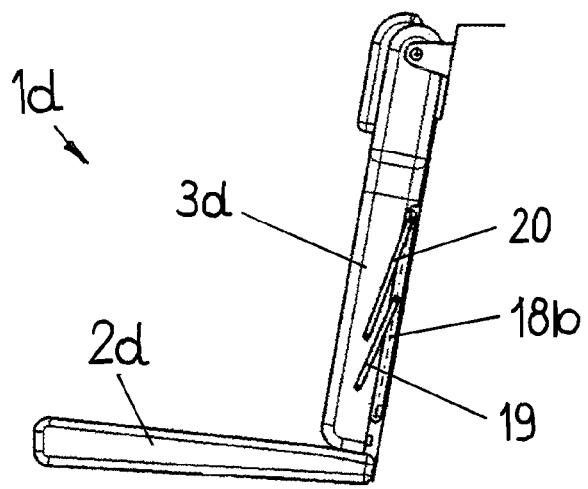
FIG. 6 illustrates a backrest having a second variant of an integrated wind deflector.

Of course, the wind deflector 18a illustrated in FIG. 5 can also be used in combination with a backrest 3a illustrated in FIG. 1. This is disposed (proceeding from a use position intended for seating) not on the left at the bottom, as in FIG. 5, but rather at the right on the top, so that the wind deflector 18a, in the use position, is situated in approximately the same position in both variants.

FIGS. 6 to 9 illustrate another embodiment of a wind deflector 18b of a bench 1d integrated into a backrest 3d. The wind deflector 18b is disposed, in a use position of the backrest 3d intended for seating (see FIG. 6), behind the same, and can be pivoted forward by way of a parallelogram mechanism formed by two rods 19, 20, in each instance.

Figure 7:
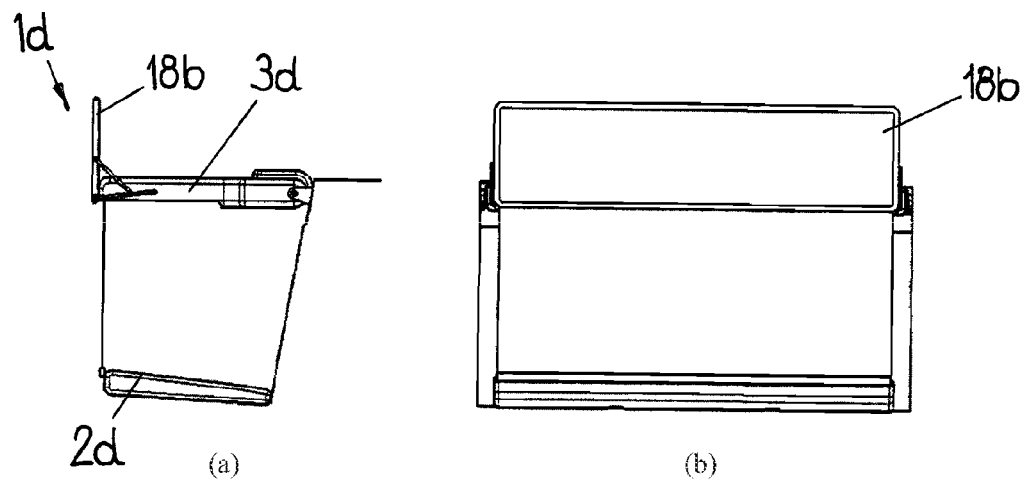
FIGS. 7A and 7B illustrate the backrest of FIG. 6 with the wind deflector activated.
Figure 8:
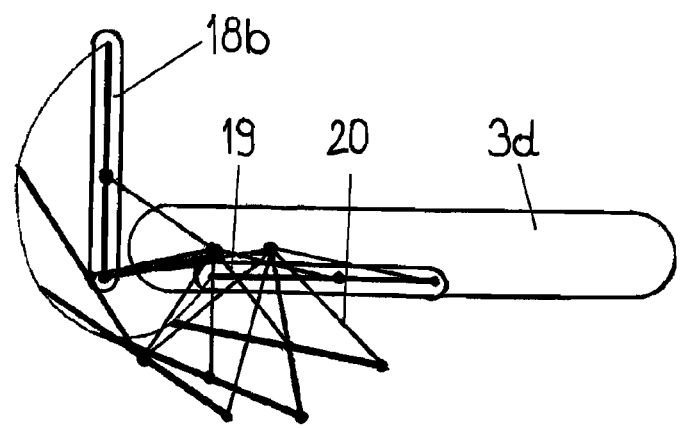
FIG. 8 illustrates a movement sequence when folding out the wind deflector in the case of a backrest of FIG. 6.

FIG. 7 illustrates the wind deflector 18b in the tilted-up position, in a side view (FIG. 7A) and in a front view (FIG. 7B).

FIG. 8 once again illustrates the movement sequence when tilting up the wind deflector 18b, where it is assumed that the backrest 3d is in the position illustrated in FIG. 7.

Figure 9:
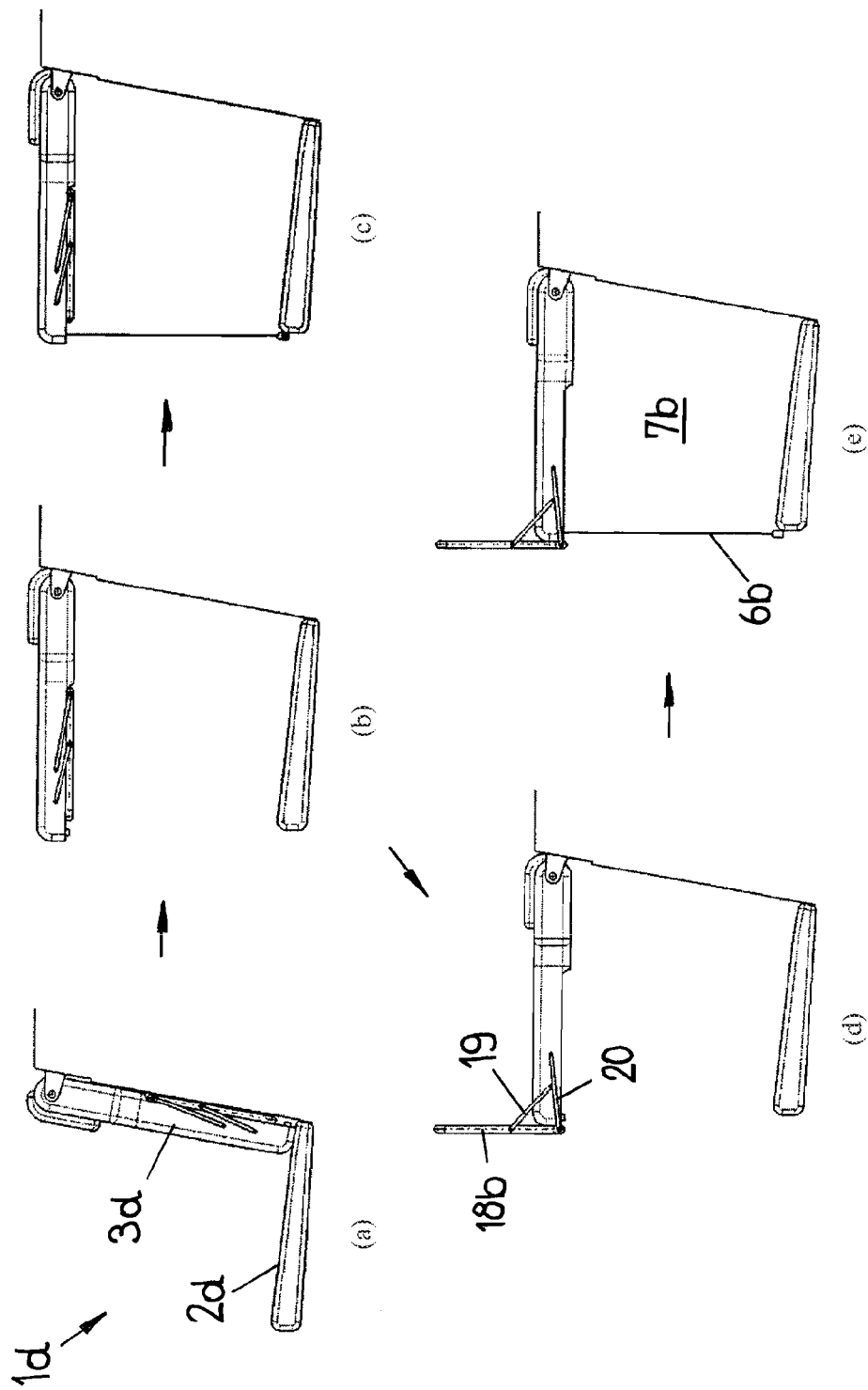
FIGS. 9A to 9E illustrate various handling positions of the backrest of FIG. 6.

FIGS. 9A to 9E illustrate the backrest 3d used in different ways. Proceeding from a use position of the backrest 3d intended for seating (FIG. 9A), it can be folded up (FIG. 9B), Then, the roller blind 6b can be pulled down to form a secured luggage area 7b (FIG. 9C). Alternatively, however, only the wind deflector 18b can be tilted up (FIG. 9D). Finally, it is also possible that both the roller blind 6b and the wind deflector 18b are activated (FIG. 9E). The status transitions are indicated with arrows in FIG. 9, in each instance.

The wind deflector 18b illustrated in FIGS. 6 to 9 can also be used in combination with a backrest 3a illustrated in FIG. 1. In this connection, the parallelogram mechanism must be adapted accordingly.

In conclusion, it is stated that the components of the figures might be shown not true to scale, and that the individual variants shown in the figures can also form the object of an independent invention. Position information such as "right," "left," "at the top," "at the bottom," and the like refer to the position of the component, in each instance, as shown, and must be changed conceptually accordingly if the stated position is changed. The terms "front" and "rear" are furthermore used in connection with the direction of travel of a vehicle and the usual installation direction of a seat or a bench, respectively. If the direction of travel or the installation direction is changed, again the stated terms must be conceptually adapted accordingly.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor vehicle seat comprising:
a first seat portion having a seat surface upon which a user is to be seated and which is non-moveably positioned in a substantially lateral direction;
a second seat portion configured for movement between a first position in which the second seat portion lies in a plane substantially non-parallel with respect to the first seat portion to thereby permit seating on the motor vehicle seat by the user, a second position in which the second seat portion is non-rotatably manipulated along a vertical axis to a spatial position vertically above the first seat portion, and a third position in which the second seat portion is rotatably manipulated about a pivot axis such that the second seat portion is spaced apart from, opposite to and lies in a plane essentially parallel with respect to the first seat portion to define a storage space; and
a storage cover to enclose the storage space, wherein the storage cover comprises a roller blind configured for movement between a non-use position in which the roller blind is rolled up in the second seat portion to expose the storage space, and a use position in which the roller blind is unrolled from the second seat portion to enclose the storage space.

2. The motor vehicle seat of claim 1, wherein the roller blind, when in the use position, is to be connected at a first point adjacent a front edge of the first seat portion and at a second point adjacent a front edge of the second seat portion.

3. The motor vehicle seat of claim 1, wherein:
the first seat portion comprises a bottom seat; and
the second seat portion comprises a backrest.

4. The motor vehicle seat of claim 1, wherein the second seat portion comprises a guide configured to permit vertical movement of the second seat portion.

5. The motor vehicle seat of claim 4, wherein the storage cover comprises a plate that is mounted for rotation on the second seat portion.

6. The motor vehicle seat of claim 5, wherein the plate is mounted for rotation on the second seat portion in a range between 0 to 270°.

7. A motor vehicle seat comprising:
a first seat portion having a non-moveable seat surface upon which a user is to be seated;
a second seat portion which is non-rotatably moveable upwardly relative to the non-moveable seat surface to a first spatial position vertically above the first seat portion, and rotatably movable about a pivot axis to a second spatial position parallel with respect to the non-moveable seat surface to thereby define a storage space; and
a storage cover moveable between a non-use position exposing the storage space and a use position enclosing the storage space, wherein the storage cover comprises a roller blind configured for movement between the non-use position in which the roller blind is rolled up in the second seat portion to expose the storage space, and the use position in which the roller blind is unrolled from the second seat portion to enclose the storage space.

8. The motor vehicle seat of claim 7, wherein the roller blind, when in the use position, is connected at a first point adjacent a front edge of the first seat portion and a second point adjacent a front edge of the second seat portion.

9. The motor vehicle seat of claim 7, wherein:
the first seat portion comprises a bottom seat; and
the second seat portion comprises a backrest.

10. The motor vehicle seat of claim 7, wherein the storage cover further includes a crossbar disposed on the roller blind, the crossbar having a pair of spaced apart locking elements to lock the roller bind in a use position and which are to be impacted by springs.

11. The motor vehicle seat of claim 7, wherein the second seat portion is configured to store the roller blind when the storage cover is in the non-use position.

12. The motor vehicle seat of claim 7, wherein the storage cover comprises a plate that is mounted for rotation on the second seat portion.

13. The motor vehicle seat of claim 7, wherein the plate is mounted for rotation on the second seat portion in a range between 0 to 90°.

14. A motor vehicle seat comprising:
a first seat portion having a non-moveable seat surface upon which a user is to be seated;
a second seat portion configured for movement relative to the first seat portion to thereby define a first storage space;
a rotational joint configured to permit non-rotatable movement of the second seat portion along a vertical axis of the rotational joint to a first spatial orientation vertically above the first seat portion, and also rotatable movement of the second seat portion about a pivot axis of the rotational joint to a second spatial orientation spaced apart from and essentially parallel with respect to the first seat portion, the second spatial orientation defining a storage space between the first seat portion and the second seat portion; and
a storage cover moveable between a non-use position exposing the storage space and a use position enclosing the storage space, wherein the storage cover comprises a roller blind configured for movement between the non-use position in which the roller blind is rolled up in the second seat portion to expose the storage space, and the use position in which the roller blind is unrolled from the second seat portion to enclose the storage space.

15. The motor vehicle seat of claim 14, wherein the roller blind, when in the use position, is connected at a first point adjacent a front edge of the first seat portion and a second point adjacent a front edge of the second seat portion.

16. The motor vehicle seat of claim 14, wherein:
the first seat portion comprises a bottom seat; and
the second seat portion comprises a backrest.

17. The motor vehicle seat of claim 15, wherein the second seat portion comprises a guide configured to permit the movement of the second seat portion along the rotational joint to the first spatial orientation.

* * * * *